(12) United States Patent
Dabrowski

(10) Patent No.: US 7,527,229 B2
(45) Date of Patent: May 5, 2009

(54) RATCHET PLATE LEVELER

(75) Inventor: Peter Dabrowski, Macomb, MI (US)

(73) Assignee: Masco Corporation, Taylor, MI (US)

( * ) Notice: Subject to any disclaimer, the term of this patent is extended or adjusted under 35 U.S.C. 154(b) by 109 days.

(21) Appl. No.: 11/669,356

(22) Filed: Jan. 31, 2007

(65) Prior Publication Data

US 2008/0179470 A1  Jul. 31, 2008

(51) Int. Cl.
*F16M 11/14* (2006.01)
(52) U.S. Cl. .................................................. 248/188.2
(58) Field of Classification Search ............. 248/188.2, 248/188.4, 544, 118.3, 188.8, 188.9, 188.91, 248/677
See application file for complete search history.

(56) References Cited

U.S. PATENT DOCUMENTS

| 774,042 | A | * | 11/1904 | Cooper ....................... 301/132 |
| 4,595,216 | A | * | 6/1986 | Ware ......................... 208/86.75 |
| 5,442,882 | A | * | 8/1995 | Repasky ....................... 52/105 |
| 6,805,513 | B2 | * | 10/2004 | Marquina .................... 403/107 |
| 7,258,313 | B2 | * | 8/2007 | Gabriel ..................... 248/188.2 |
| 7,318,570 | B2 | * | 1/2008 | Lin et al. .................. 248/188.2 |
| 2004/0178305 | A1 | * | 9/2004 | Avendano et al. ......... 248/188.2 |
| 2006/0006295 | A1 | * | 1/2006 | Gainer .................... 248/188.4 |

* cited by examiner

*Primary Examiner*—Ramon O Ramirez
(74) *Attorney, Agent, or Firm*—Nirav D. Parikh

(57) ABSTRACT

An example leveling device includes a first plate having a first set of positioning teeth and a second plate having a second set of positioning teeth. The first set of positioning teeth engage the second set of positioning teeth. The first plate is rotatable relative to the second plate to alter the angular relationship between the first plate and the second plate to provide a level surface.

19 Claims, 5 Drawing Sheets

RATCHET PLATE LEVELER

BACKGROUND OF THE INVENTION

This invention generally relates to a leveling device, and more particularly to an adjustable leveling device for providing a level surface.

Numerous appliances, including but not limited to bathtubs, showers, cabinetry, furniture, washing machines, and refrigerators, require a level surface for proper positioning of the appliance at a desired location of an installation surface. An appliance positioned on an unlevel surface may be unstable with respect to that surface. This is often annoying to the appliance user and may detract from the overall functionality of the appliance.

Typically, an installer positions the appliance at a desired location of the installation surface and then determines whether the appliance is level at that location. If the appliance is not level, the installer must remove the appliance and modify the surface until it reads level. For example, with respect to bathtub installations, a bathtub is inserted into an alcove and the installer determines whether the bathtub is level within the alcove. If the bathtub is not level, the installer removes the bathtub and adds shims at a necessary location of the alcove. The bathtub is then reinserted into the alcove and the level measurement of the bathtub within the alcove is repeated. This entire process is repeated until the bathtub reads level.

Disadvantageously, this process is time consuming. In addition, the use of shims may not always provide a completely level surface. The inability to provide a surface that is completely level may result in the subsequent instability of the appliance at the installation surface.

Accordingly, it is desirable to provide a leveling device for providing a level surface for an appliance prior to placing the appliance at a desired location of the installation surface.

SUMMARY OF THE INVENTION

An example leveling device includes a first plate having a first set of positioning teeth, and a second plate having a second set of positioning teeth. The first set of positioning teeth engage the second set of positioning teeth. The first plate is rotatable relative to the second plate to alter the angular relationship between the first plate and the second plate to provide a level surface.

An example method for providing a level surface includes positioning a leveling device relative to an installation surface, determining whether the leveling device is level at the installation surface and rotating a first plate with respect to a second plate of the leveling device to provide a level surface. The second plate is rotated with respect to the first plate only where the leveling device is not level at the installation surface.

An example leveling device includes an appliance and a leveler. The leveler includes a first plate and a second plate. The first plate is rotatable relative to the second plate to provide a level surface. The appliance is received on a level surface provided by the leveler.

The various features and advantages of this invention will become apparent to those skilled in the art from the following detailed description. The drawings that accompany the detailed description can be briefly described as follows.

DETAILED DESCRIPTION OF THE PREFERRED EMBODIMENT

Figure 1:
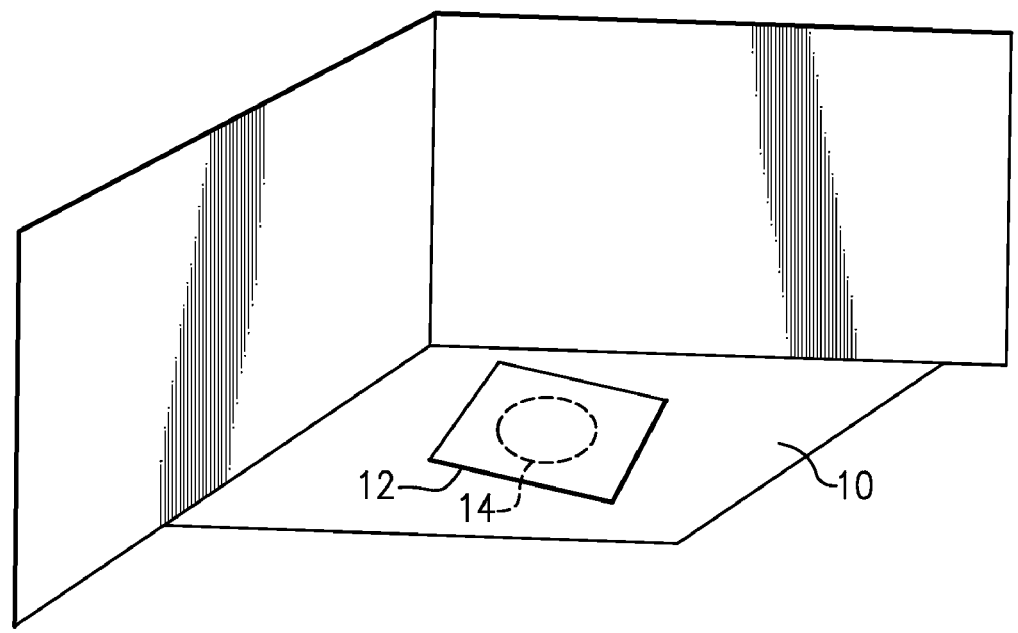
FIG. 1 illustrates the installation of an appliance with an example ratchet plate leveler.

FIG. 1 illustrates an installation surface 10 which requires a level surface for installation of an appliance 12. The installation surface 10 may include any surface, including interior surfaces of homes, buildings or other structures, or exterior surfaces, at which an installer may wish to position an appliance 12. For example, the installation surface 10 may be an alcove which receives a bathtub apparatus. A ratchet plate leveler 14 is positioned between the installation surface 10 and the appliance 12 to provide a level surface for the appliance 12. Although shown and described as a ratchet plate leveler for a bathtub apparatus, it should be understood that the example ratchet plate leveler may be utilized to provide a level surface for any type of appliance, including but not limited to bathtubs, showers, furniture, cabinetry, washers and dryers. The number of ratchet plate levelers 14 required to provide a level surface for the installation of an appliance 12 will vary depending upon the size and shape of the appliance 12 and other design specific parameters.

Figure 2:
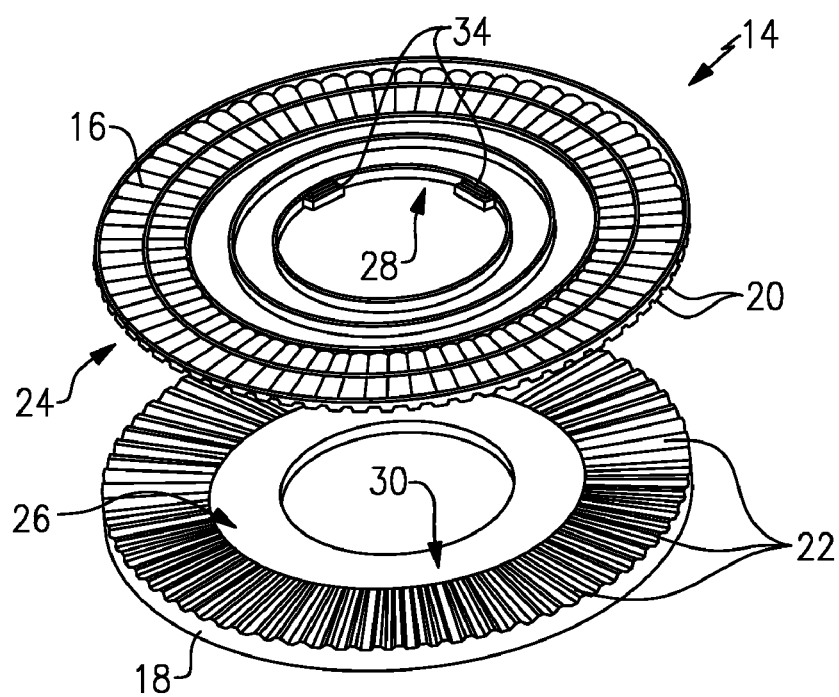
FIG. 2 illustrates a schematic view of an example ratchet plate leveler.

FIG. 2 illustrates an example ratchet plate leveler 14. The ratchet plate leveler 14 includes a first plate 16 and a second plate 18. In one example, the plates 16, 18 of the ratchet plate leveler 14 are comprised of plastic, although any known material may be utilized to fabricate the ratchet plate leveler 14. The first plate 16 and the second plate 18 are rotatable with respect to one another to alter the angular relationship between the first plate 16 and the second plate 18, as is further discussed below.

Figure 3:
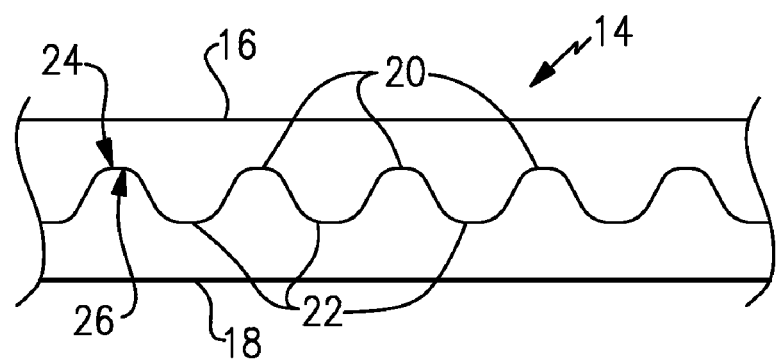
FIG. 3 illustrates a portion of an assembled ratchet plate leveler.

The first plate 16 includes a first set of positioning teeth 20 and the second plate 18 includes a second set of positioning teeth 22. Each set of positioning teeth 20, 22 are circumferentially disposed about a mounting surface 24, 26 of each of the first plate 16 and the second plate 18. The first set of positioning teeth 20 engage the second set of positioning teeth 22 where the mounting surfaces 24, 26 of the first plate 16 and the second plate 18 are in direct contact with one another (See FIG. 3). The first plate 16 and the second plate 18 are unable to rotate relative to one another where the first set of positioning teeth 20 and the second set of positioning teeth 22 are engaged. That is, the positioning teeth 20, 22 must be disengaged by raising the first plate 16 away from the second plate 18 to alter the angular relationship therebetween.

Each plate 16, 18 also includes a seat portion 28, 30, respectively. The seat portions 28, 30 are disposed radially inwardly from the positioning teeth 20, 22. In one example, the seat portions 28, 30 have openings extending through the center of each of the first plate 16 and the second plate 18 such that the plates 16, 18 are disk like members. In another example, the seat portions 28, 30 are solid, smooth surfaces.

The example plates 16, 18 of the ratchet plate leveler 14 are substantially circular in shape, although it should be understood that other shapes may be possible. The actual size and shape of the ratchet plate leveler 14 will vary depending upon design specific parameters including the size and shape of the installation surface 10 and the size and shape of the appliance 12 being installed.

At least one of the plates 16, 18 includes bubble vials 34. In the illustrated example, the first plate 16 includes two bubble vials 34 positioned adjacent to the seat portion 28 of the first plate 16. The bubble vials 34 may be positioned anywhere on the plate 16 or the plate 18 which is in plain view by an installer. An installer utilizes the bubble vials 34 to determine whether the ratchet plate leveler 14 is level with respect to the installation surface 10.

Figure 4A:
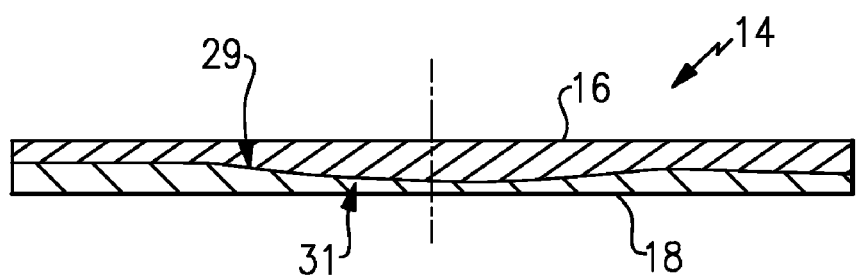
FIG. 4A illustrates a cross-sectional view of the ratchet plate leveler.
Figure 4B:
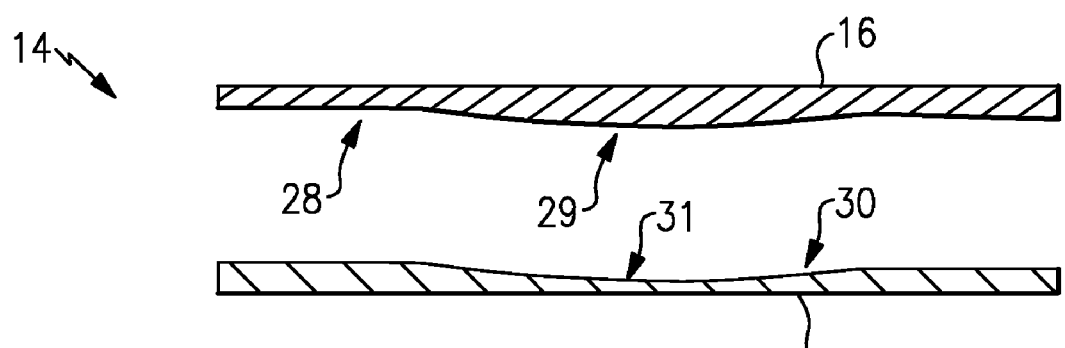
FIG. 4B illustrates a cross-sectional assembly view of the ratchet plate leveler.

Referring to FIGS. 4A and 4B, the seat portion 28 of the first plate 16 includes a convex surface 29, in one example. The seat portion 30 of the second plate 18 includes a concave surface 31. The convex surface 29 and the concave surface 31 cup one another where the mounting surface 24 of the first plate 16 is in direct contact with the mounting surface 26 of the second plate 18 (See FIG. 4A). It should be understood that an opposite configuration is possible, wherein the seat portion 28 includes the concave surface and the seat portion 30 includes the convex surface.

Figure 5:
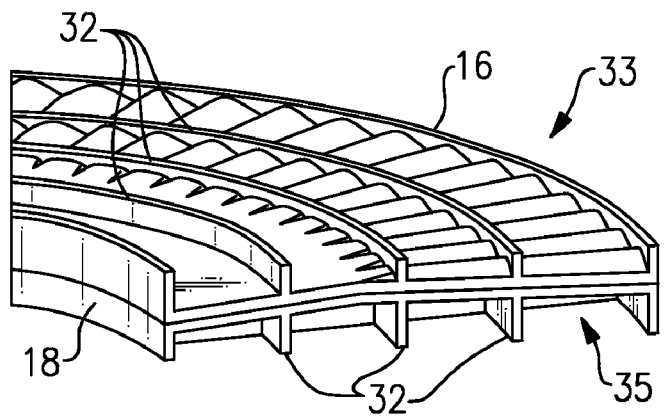
FIG. 5 illustrates another view of the ratchet plate leveler.

FIG. 5 illustrates a plurality of support ribs 32 of the first plate 16 and the second plate 18. The plurality of support ribs 32 extend circumferentially about an exterior surface 33, 35 of the first plate 16 and the second plate 18, respectively. The support ribs 32 provide structural support to the ratchet plate leveler 14 for supporting appliances 12 of varying sizes and weights.

Figure 6:
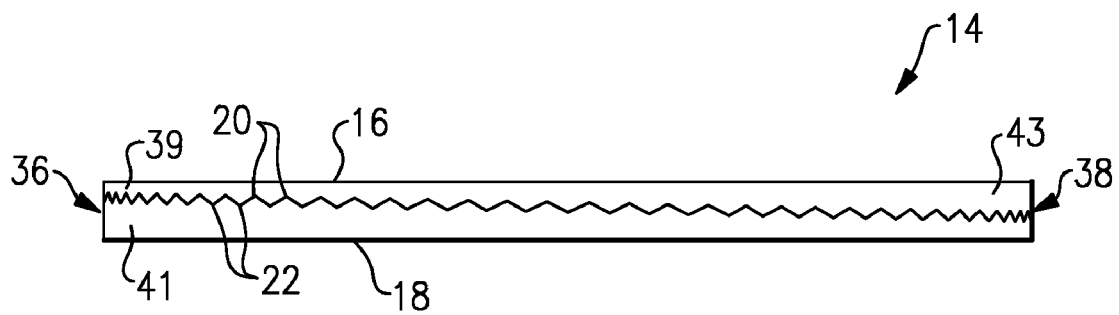
FIG. 6 is a side view of a ratchet plate leveler at a first position.

FIG. 6 illustrates the ratchet plate leveler 14 with the first plate 16 in direct contact with the second plate 18. That is, the first set of positioning teeth 20 of the first plate 16 is engaged with the second set of positioning teeth 22 of the second plate 18. In this position, the ratchet plate leveler 14 includes a first side 36 and an opposing second side 38. In one example, a thickness of each of the first plate 16 and the second plate 18 decreases between the opposing sides 36, 38.

In the example configuration of FIG. 6, the plates 16, 18 are arranged such that the thickness of the first plate 16 decreases between the first side 36 and the second side 38 and the thickness of the second plate 18 decreases between the second side 38 and the first side 36. Therefore, the sides of opposing thickness (i.e. the thin section 39 of the first plate 16 is received against the thick section 41 of the second plate 18 and vice versa) of each plate 16, 18 are received against one another. The first plate 16 is parallel relative to the second plate 18 at this position. This position is defined as the zero position of the ratchet plate leveler 14.

Figure 7:
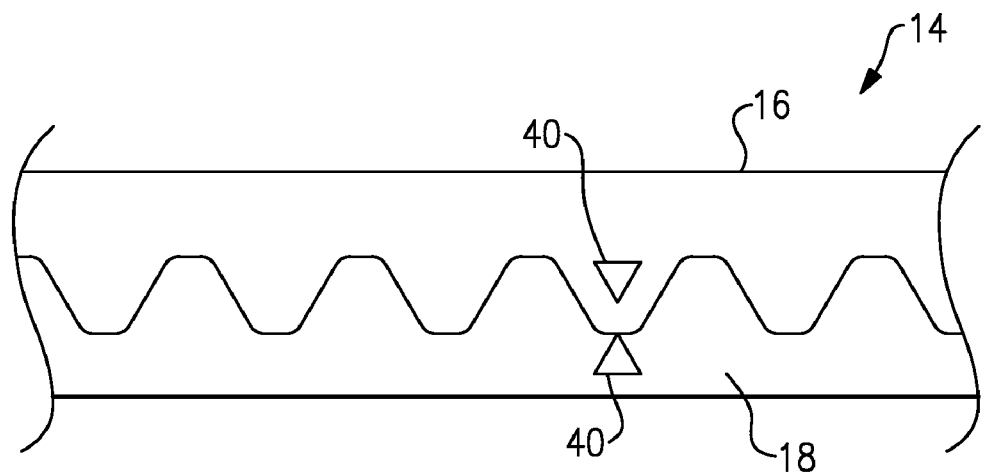
FIG. 7 illustrates indicator marks for positioning the ratchet plate leveler at the first position shown in FIG. 6.

Indicator marks 40 are included on each of the first plate 16 and the second plate 18 (See FIG. 7). Indicator marks 40 may include a scribe line, or any other marking, which indicate the zero position of the ratchet plate leveler 14. The indicator marks 40 of each of the first plate 16 and the second plate 18 are aligned with one another to achieve the zero positioning of the ratchet plate leveler 14.

Figure 8:
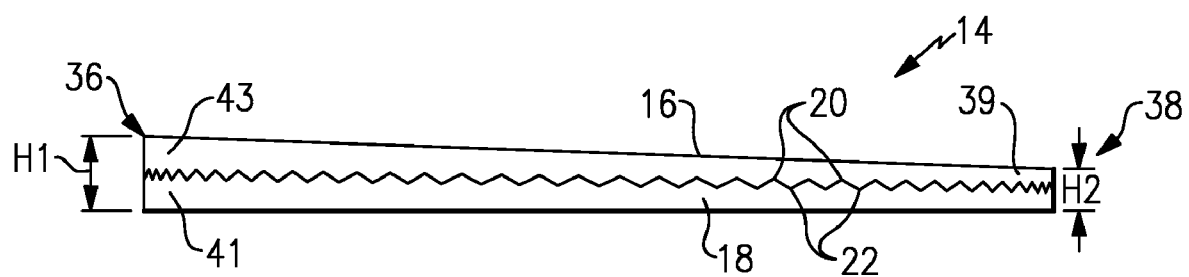
FIG. 8 is a side view of the ratchet plate leveler at a second position.

FIG. 8 illustrates a second position of the ratchet plate leveler 14. In this position, the first plate 16 is rotated 180 degrees (i.e., the position teeth 20 are repositioned relative to the positioning teeth 22) relative to the second plate 18 to vary the angular relationship between the two plates 16, 18. This is called the 180° position of the ratchet plate leveler 14. In this position, the sides of similar thickness (i.e. the thick section 43 of the first plate 16 is received against the thick section 41 of the second plate 18 and vice versa) of the first plate 16 and the second plate 18 are received against one another.

Therefore, at the 180° position, a height H1 of the first side 36 of the ratchet plate leveler 14 is greater than a height H2 of the second side 38 such that the first plate 16 and the second plate 18 are not parallel to one another. An installer utilizes the 180° position, or any other position, of the ratchet plate leveler 14 to provide a level surface for an appliance 12 where the installation surface 10 does not read level, as is further discussed below. The actual position (i.e., zero position, 180° position, etc.) of the ratchet plate leveler 14 will vary depending upon the degree the installation surface 10 reads out of level.

Figure 9:
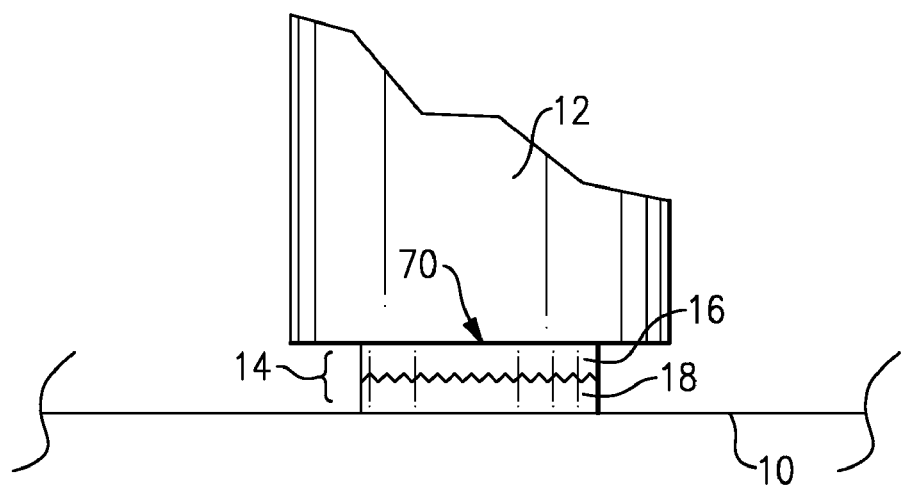
FIG. 9 illustrates a schematic view of an appliance received on a level surface provided by a ratchet plate leveler.

Referring to FIG. 9, an appliance 12 is received on the ratchet plate leveler 14 once the first plate 16 and the second plate 18 are positioned at the installation surface 10. The ratchet plate leveler defines a level surface 70. Therefore, the appliance 12 is level once positioned on the ratchet plate leveler 14 and mounted at the installation surface 10.

Figure 10:
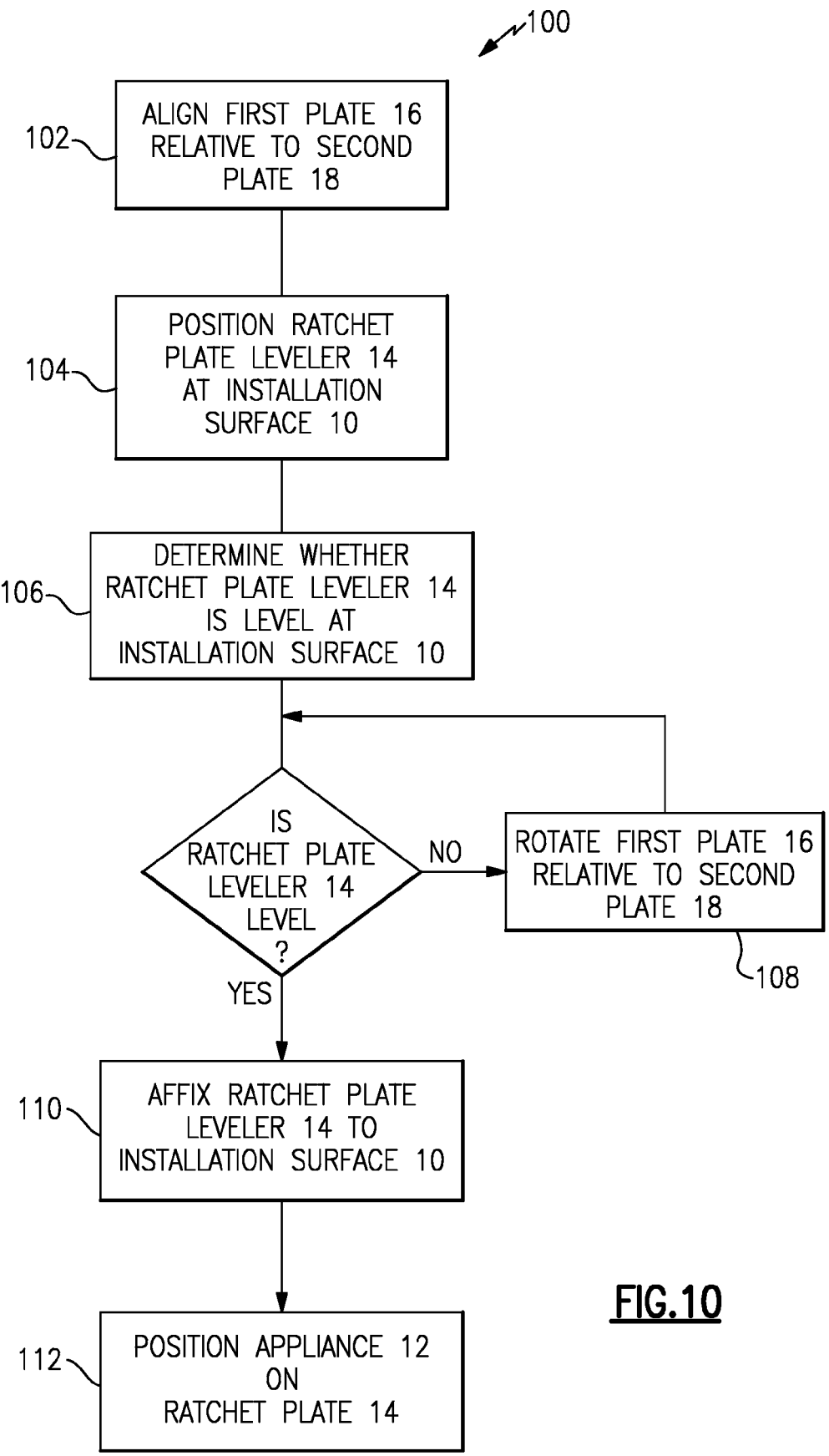
FIG. 10 is a block diagram illustrating an example method for providing a level surface.

Referring to FIG. 10, and with continuing reference to FIGS. 1-9, a method 100 for providing a level surface with the ratchet plate leveler 14 is illustrated. At step block 102, the first plate 16 is aligned relative to the second plate 18 such that the first plate 16 is parallel to the second plate 18 (i.e., the ratchet plate leveler 14 is positioned at its zero position). The indicator marks 40 are utilized to align the first plate 16 relative to the second plate 18.

The ratchet plate leveler 14 is positioned at a specific location of the installation surface 10 at step block 104. In one example, the ratchet plate leveler 14 is positioned near the center of the installation surface 10. However, the ratchet plate leveler 14 may be positioned anywhere within an area defined by the installation surface 10. Next, at step block 106, an installer determines whether the ratchet plate leveler 14 is level at the installation surface 10. The installer utilizes the bubble vials 34 to determine whether the ratchet plate leveler 14 is level with respect to the installation surface 10. Of course, in practice, the invention may simply allow the provision of a surface that is close to level, or more level than before its use.

In the event the bubble vials 34 indicate an unlevel surface at step block 106, the first plate 16 is rotated with respect to the second plate 18 to provide a level surface at step block 108. The first set of finishing teeth 20 are repositioned relative to the second set of positioning teeth 22 to alter the angular relationship between the first plate 16 and the second plate 18. In another example, both the first plate 16 and the second plate 18 may be rotated in opposite directions of one another to alter the angular relationship therebetween.

The ratchet plate leveler 14 is rigidly affixed to the installation surface 10 at step block 110 once the installer determines that the ratchet plate leveler 14 provides a level surface at the installation surface 10. In one example, the ratchet plate leveler 14 is affixed to the installation surface 10 with threaded fasteners. In another example, the ratchet plate leveler 14 is affixed with an adhesive.

The method 100 concludes at step block 112 where the appliance 12, such as a bathtub apparatus, for example, is positioned on the ratchet plate leveler 14. Because the ratchet plate leveler 14 provides a level surface, the appliance 12 is level once installed.

The foregoing description shall be interpreted as illustrative and not in any limiting sense. A worker of ordinary skill in the art would recognize that certain modifications would come within the scope of this invention. For that reason, the following claims should be studied to determine the true scope and content of this invention.

What is claimed is:

1. A leveling device, comprising:
a first plate having a first set of positioning teeth; and
a second plate positioned on an installation surface and having a second set of positioning teeth which engage said first set of positioning teeth, wherein said first plate is rotatable relative to said second plate to alter the angular relationship between said first plate and said second plate to provide a more level surface at said installation surface.

2. The device as recited in claim 1, wherein said first set of positioning teeth is disposed circumferentially about a mounting surface of said first plate and said second set of positioning teeth is disposed circumferentially about a mounting surface of said second plate, wherein said mounting surfaces are in direct contact in response to engagement of said first set of positioning teeth and said second set of positioning teeth.

3. The device as recited in claim 2, wherein said mounting surfaces of said first plate and said second plate include a spherical seat portion, wherein said spherical seat portion of said first plate includes one of a concave surface and a convex surface and said spherical seat portion of said second plate includes the other of said concave surface and said convex surface.

4. The device as recited in claim 1, wherein at least one of said first plate and said second plate includes at least one bubble vial.

5. The device as recited in claim 1, wherein said first plate and said second plate are disk-shaped and said first set of positioning teeth and said second set of positioning teeth are disposed circumferentially about said first plate and said second plate, wherein an opening is provided radially inwardly from said first set of positioning teeth and said second set of positioning teeth on each of said first plate and said second plate.

6. The device as recited in claim 1, wherein each of said first plate and said second plate includes a decreasing thickness between opposite sides of each of said first plate and said second plate.

7. The device as recited in claim 1, wherein said first plate is rotatable between a first position and a second position relative to said second plate, wherein said first plate is parallel to said second plate at said first position and said first plate is non-parallel relative to said second plate at said second position.

8. The device as recited in claim 1, wherein said installation surface is an alcove for receiving an appliance.

9. A method for providing a level surface, comprising the steps of:
(a) positioning a leveling device relative to an installation surface including aligning an indicator mark of a first plate with an indicator mark of a second plate such that the first plate is parallel relative to the second plate, and engaging a first set of teeth of the first plate with a second set of teeth of second plate;
(b) determining whether the leveling device is level at the installation surface; and
(c) rotating the first plate with respect to the second plate of the leveling device to provide a more level surface in response to determining the leveling device is non-level at said step (b).

10. The method as recited in claim 9, comprising the step of:
(d) positioning an appliance on the more level surface provided in said step (c).

11. The method as recited in claim 10, wherein the appliance comprises a bathtub apparatus.

12. The method as recited in claim 9, wherein said step (c) comprises the step of:
repositioning the first set of teeth relative to the second set of teeth to alter the angular relationship between the first plate and the second plate.

13. The method as recited in claim 9, wherein said step (b) comprises the step of:
reading at least one bubble vial to determine whether the leveling device is level at the installation surface.

14. The method as recited in claim 9, wherein said step (c) comprises the step of:
rotating the first plate in a first direction; and
rotating the second plate in a second direction, wherein the second direction is opposite of the first direction.

15. A leveling device, comprising:
an appliance;
a leveler having a first plate and a second plate, said first plate rotatable relative to said second plate to provide a more level surface, wherein said appliance is received on said more level surface provided by said leveler; and
wherein each of said first plate and said plate include a set of positioning teeth, said positioning teeth of said first plate engaging said positioning teeth of said second plate.

16. The device as recited in claim 15, wherein said appliance comprises a bathtub apparatus.

17. The device as recited in claim 15, wherein a thickness of each of said first plate and said second plate decreases between opposite sides of each of said first plate and said second plate.

18. The device as recited in claim 15, wherein each of said first plate and said second plate includes a mounting portion having a spherical seat portion, wherein said spherical seat portion of said first plate includes one of a concave surface and a convex surface and said spherical seat portion of said second plate includes the other of said concave surface and said convex surface.

19. The device as recited in claim 15, wherein said first plate is rotatable between a first position and a second position relative to said second plate, wherein said first plate is parallel to said second plate at said first position and said first plate is non-parallel relative to said second plate at said second position.

* * * * *